(No Model.)

E. A. DEAN.
TIRE FOR ICE BICYCLES.

No. 582,010. Patented May 4, 1897.

WITNESSES
John Buckley
C. Gerst

INVENTOR
Emmet A. Dean
BY
Edgar Gale & Co
ATTORNEYS

THE NORRIS PETERS CO., PHOTO-LITHO., WASHINGTON, D. C.

UNITED STATES PATENT OFFICE.

EMMET A. DEAN, OF CLEAR LAKE, WISCONSIN.

TIRE FOR ICE-BICYCLES.

SPECIFICATION forming part of Letters Patent No. 582,010, dated May 4, 1897.

Application filed October 7, 1896. Serial No. 608,114. (No model.)

*To all whom it may concern:*

Be it known that I, EMMET A. DEAN, a citizen of the United States, and a resident of Clear Lake, in the county of Polk and State of Wisconsin, have invented certain new and useful Improvements in Tires for Ice-Bicycles and Similar Vehicles, of which the following is a specification, reference being had to the accompanying drawings, forming a part thereof, in which similar numerals of reference indicate corresponding parts wherever found throughout the several views.

This invention relates to ice-bicycles and similar vehicles; and the object thereof is to provide improved means for tightening tires on the wheels of such vehicles.

The invention is fully disclosed in the following specification, of which the accompanying drawings form a part, in which—

Figure 1:
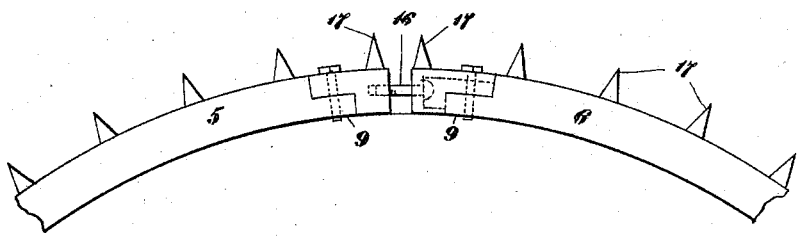
Figure 2:
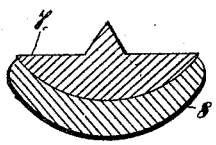
Figure 3:
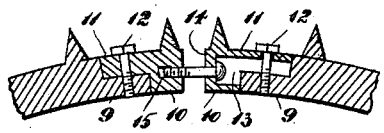

Figure 1 is a side view of the separate ends of the tire of a vehicle connected according to my improvement; Fig. 2, a cross-section of the tire; Fig. 3, a longitudinal section of the construction in Fig. 1, and Fig. 4 a side view of a bolt which I employ.

In the drawings forming part of this specification I have shown at 5 and 6 the separate ends of a tire, the main portion 7 of which is shown in Fig. 2. I have also shown a part of the rim 8 of the wheel with which said tire is connected.

In the practice of my invention the outer surface of the tire is cut away so as to form outwardly-directed end extensions 9 at the inner side thereof and at each end, and I also provide end pieces 10, which are similar in form, each end piece being the same in form in cross-section as the tire, and each end piece 10 is provided with an extension 11, which overlaps the extension 9 at the end of the tire to which it is secured, and said end pieces are secured to said extensions 9 by bolts or screws 12.

One of the end pieces 10 is hollow or provided with a chamber 13, the outer end of which is closed, as shown at 14, and the opposite end piece 10 is provided with a screw-threaded bore 14, and in practice I pass a bolt 16 through the chamber 13 in one of the end pieces 10, through the closed end 14 thereof, and into the screw-threaded bore of the opposite end piece.

Figure 4:
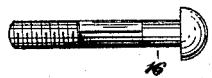

The middle portion of the bolt 16 is angular in form in cross-section, as clearly shown in Fig. 4, and said bolt may be tightened or loosened by applying a suitable wrench to the middle portion thereof between the ends of the tire or the end pieces 10, and the tire is of such length that said end pieces are never drawn entirely together.

The tire is provided with outwardly-directed teeth or projections 17, which are formed thereon or secured thereto at regular intervals, and each of the end pieces 10 is also provided with one of these outwardly-directed teeth or projections, as clearly shown in Figs. 1 and 3.

My improvement is well adapted to accomplish the result for which it is intended, and it is also comparatively inexpensive and may be applied to vehicles of other forms as well as to ice-bicycles.

Having fully described my invention, I claim as new and desire to secure by Letters Patent—

A tire in combination with the rim of a wheel, and having outwardly-directed extensions on the inner ends thereof, end pieces secured thereon, and overlapping the same, one of said end pieces being hollow and provided with an end piece having a screw-threaded opening therein, a bolt passing therethrough and engaging the opposite end piece and teeth on the bearing-surface of said tire substantially as described.

In testimony that I claim the foregoing as my invention I have signed my name, in presence of the subscribing witnesses, this 1st day of October, 1896.

EMMET A. DEAN.

Witnesses:
ADELLE DAVIS,
J. W. DEAN.